United States Patent
Sundaram et al.

(10) Patent No.: US 11,588,903 B2
(45) Date of Patent: Feb. 21, 2023

(54) USER SWITCHING FOR MULTI-USER DEVICES

(71) Applicant: Apple Inc., Cupertino, CA (US)

(72) Inventors: Vijay Sundaram, San Ramon, CA (US); Caleb M. Davenport, Campbell, CA (US); Patrick L. Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/087,549

(22) Filed: Nov. 2, 2020

(65) Prior Publication Data

US 2021/0377360 A1 Dec. 2, 2021

Related U.S. Application Data

(60) Provisional application No. 63/032,418, filed on May 29, 2020.

(51) Int. Cl.

| | |
|---|---|
| *H04L 67/306* | (2022.01) |
| *H04L 67/12* | (2022.01) |
| *H04L 12/28* | (2006.01) |
| *G06F 16/9035* | (2019.01) |
| *G06F 21/62* | (2013.01) |
| *G06F 21/60* | (2013.01) |
| *G06F 16/90* | (2019.01) |

(Continued)

(52) U.S. Cl.
CPC .......... *H04L 67/306* (2013.01); *G06F 9/4451* (2013.01); *G06F 9/44505* (2013.01); *G06F 16/90* (2019.01); *G06F 16/9035* (2019.01); *G06F 21/60* (2013.01); *G06F 21/629* (2013.01); *H04L 12/2803* (2013.01); *H04L 67/12* (2013.01); *H04N 1/00501* (2013.01); *H04N 1/00509* (2013.01); *G06F 16/904* (2019.01); *H04L 2012/285* (2013.01); *H04L 2012/2841* (2013.01)

(58) Field of Classification Search
CPC ... H04L 67/306; G06F 16/9035; G06F 16/90; G06F 9/44505
See application file for complete search history.

(56) References Cited

U.S. PATENT DOCUMENTS

| 9,509,653 B2 * | 11/2016 | Nerieri | H04L 67/306 |
| 2003/0023619 A1 * | 1/2003 | Beyda | G06F 16/273 |

(Continued)

OTHER PUBLICATIONS

Johnson, "How to add multiple accounts to Apple TV," Macworld, Aug. 2019, retrieved from https://www.macworld.com/article/3431158/how-to-add-multiple-accounts-to-apple-tv.html, 5 pages.

(Continued)

*Primary Examiner* — David E Choi
(74) *Attorney, Agent, or Firm* — BakerHostetler

(57) ABSTRACT

User switching for multi-user devices is provided. Each of multiple users of the multi-user device can have multiple external accounts that are each associated with one or more applications installed at the device. The user switching is provided such that each application installed at the device can be operated using user-specific data for the correct account of the correct user. The user switching is provided such that an app developer of an application for the multi-user device does not have to manage multiple data stores for multiple users.

20 Claims, 6 Drawing Sheets

(51) Int. Cl.
   *H04N 1/00*     (2006.01)
   *G06F 9/445*    (2018.01)
   *G06F 16/904*   (2019.01)

(56) References Cited

U.S. PATENT DOCUMENTS

| | | | |
|---|---|---|---|
| 2013/0244784 A1* | 9/2013 | Assa | G06F 3/0416 |
| | | | 463/40 |
| 2014/0075352 A1 | 3/2014 | Hansen et al. | |
| 2015/0296369 A1* | 10/2015 | Berionne | H04W 8/183 |
| | | | 455/418 |
| 2016/0085564 A1 | 3/2016 | Arcese et al. | |
| 2016/0373548 A1* | 12/2016 | Fails | H04L 67/306 |
| 2017/0078230 A1* | 3/2017 | Nerieri | H04L 67/26 |
| 2018/0176220 A1* | 6/2018 | Worley | G06F 3/0488 |
| 2018/0316638 A1* | 11/2018 | Yishay | H04L 51/34 |
| 2020/0329366 A1* | 10/2020 | Katoh | H04W 48/16 |
| 2021/0051158 A1* | 2/2021 | Yang | G06F 16/13 |

OTHER PUBLICATIONS

International Search Report and Written Opinion from PCT/2021/034827, dated Sep. 13, 2021, 14 pages.

\* cited by examiner

USER SWITCHING FOR MULTI-USER DEVICES

CROSS REFERENCE TO RELATED APPLICATIONS

This application claims the benefit of priority to U.S. Provisional Patent Application No. 63/032,418, entitled "User Switching For Multi-User Devices," filed on May 29, 2020, the disclosure of which is hereby incorporated herein in its entirety.

TECHNICAL FIELD

The present description relates generally to user switching for multi-user devices, and more particularly to user switching for multi-user devices on a per application basis.

BACKGROUND

Multiple different devices in a home may be communicably coupled together to form a connected home environment. For example, a connected home environment may include a smart thermostat, smart switches, smart light bulbs, and the like. Multi-user devices may be included in the connected home environment.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
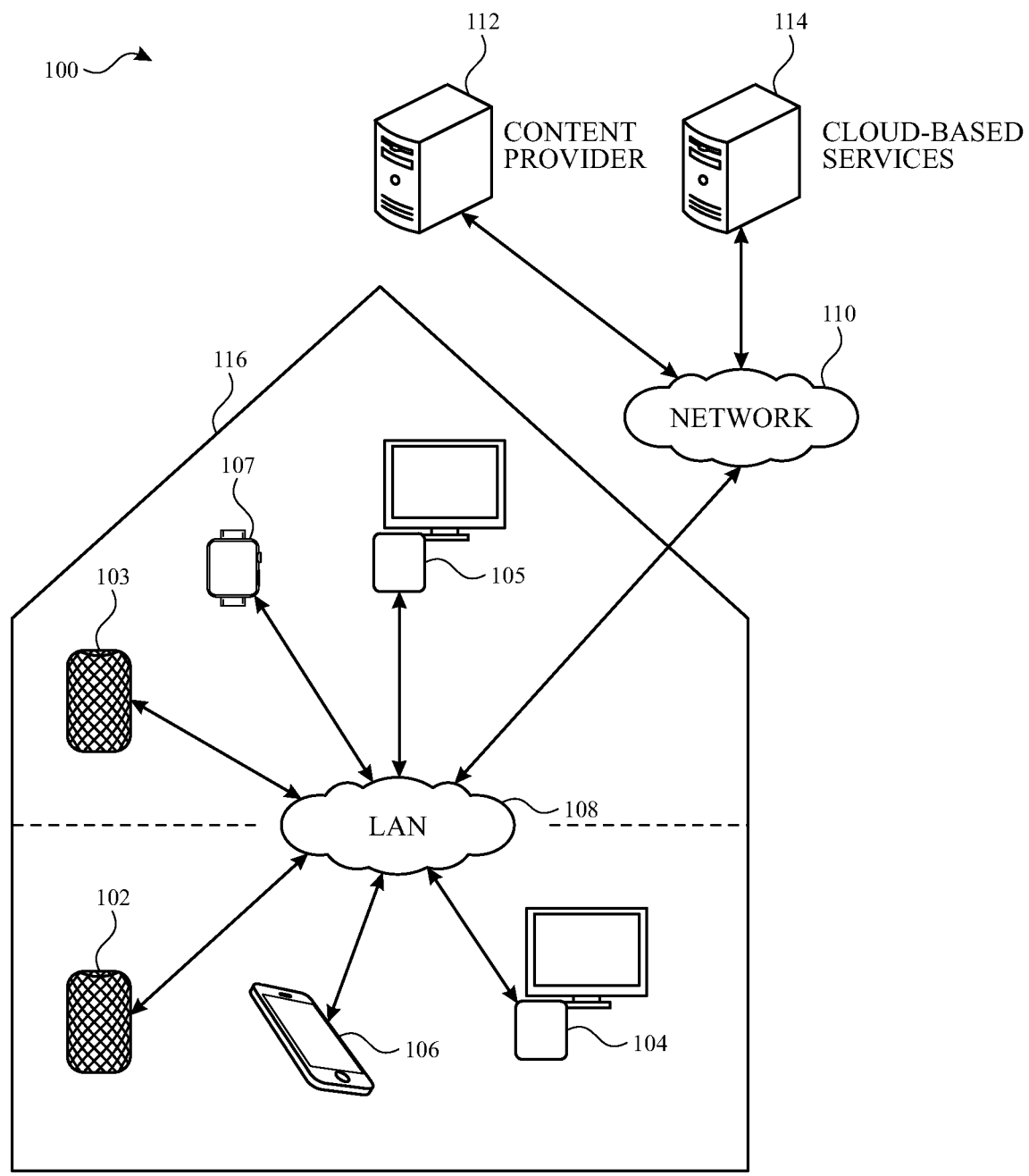
FIG. 1 illustrates an example network environment that includes multi-user devices in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Electronic devices commonly provide applications, services, and/or other features that are associated with, or connected to, external accounts for the user of the device. For example, a streaming application on a mobile phone may be associated with a user account at a streaming service provider server, and a photo album application may be configured to display photos that are stored at a cloud server in connection with a cloud account of the user. In this way, applications, services, and/or other features provided by the electronic device can leverage the processing power, storage, and/or other resources of various remote servers with which the user of the electronic device maintains an account, and service providers can control access to various applications and services for account holders.

A multi-user device may facilitate user switching to allow various authorized or registered users of the multi-user device to operate the multi-user device. Multi-user devices can also provide applications, services, and/or other features that are associated with, or connected to, external accounts for a currently active, or logged-in, user of the multi-user device. Thus, when the active user of the multi-user device switches, the external accounts used by the applications, services, etc. may also change.

However, user switching can be become particularly complicated when the multi-user device is part of a connected home environment that is managed by one of the users, such as a primary user. In this regard, one or more processes or applications of the multi-user device may need to remain associated with the external account of the primary user even when the currently active or logged-in, user of the multi-user devices switches.

The disclosed solution maintains a logical mapping between all accounts of each user when the current or active user account on a multi-user device is switched. As described in further detail herein, the solution is implemented in a way that is developer friendly, in that an application developer does not need to know about or manage data for the multiple accounts of each user, or even be aware that there are multiple users of the multi-user device. With the disclosed solution, an application developer can provide an application that accommodates user switching between multiple users of a multi-user device by, for example, simply opting into a multi-user option provided a framework of the multi-user device. Conversely, if the application should remain associated with the external account of the primary user regardless of and/or irrespective of which user is currently active, and/or if the application developer does not want user switching for the application managed by the multi-user device, the application developer may opt out of the multi-user option.

Internally, the multi-user device generates a profile for each user of the device, keeping track of each account of each user in that user's profile before, during, and/or after user-switching events at the multi-user device. Thus, when an application and/or service is launched, the multi-user device determines whether the application/service is configured to accommodate user switching and accordingly facilitates providing the application/service with access to the appropriate external user account information. In this manner, the subject technology can provide for user switching for a multi-user device that is effectuated and/or controlled on a per application/service basis.

FIG. 1 illustrates an example network environment 100 that includes a multi-user device in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In the example of FIG. 1, a network environment 100 includes electronic devices 102, 103, 104, 105, 106 and 107 (hereinafter "the electronic devices 102-107"), a local area network ("LAN") 108, a network 110, and a content provider 112 and one or more cloud-based service(s) 114 (hereinafter "the servers 112-114"). In one or more implementations, the electronic devices 102-107 may part of a connected home environment 116, and the LAN 108 may communicatively (directly or indirectly) couple any two or more of the electronic devices 102-107 within the connected home environment 116. Moreover, the network 110 may communicatively (directly or indirectly) couple any two or more of the electronic devices 102-107 with the content provider 112 and/or the cloud-based services 114, for example, in conjunction with the LAN 108.

In one or more implementations, the LAN 108 may include one or more different network devices/network medium and/or may utilize one or more different wireless and/or wired network technologies, such as Ethernet, optical, Wi-Fi, Bluetooth, Zigbee, Powerline over Ethernet, coaxial, Ethernet, Z-Wave, cellular, or generally any wireless and/or wired network technology that may communicatively couple two or more devices.

In one or more implementations, the network 110 may be an interconnected network of devices that may include, and/or may be communicatively coupled to, the Internet. For explanatory purposes, the network environment 100 is illustrated in FIG. 1 as including electronic devices 102-107, and the servers 112-114; however, the network environment 100 may include any number of electronic devices and any number of servers.

One or more of the electronic devices 102-107 may be, for example, a portable computing device such as a laptop computer, a smartphone, a smart speaker, a peripheral device (e.g., a digital camera, headphones), a set top box including a digital media player, a tablet device, a wearable device such as a smartwatch or a band, a connected home device, such as a wireless camera, a router and/or wireless access point, a wireless access device (e.g., a door lock), a smart thermostat, smart light bulbs, home security devices (e.g., motion sensors, door/window sensors, etc.), smart outlets, smart switches, and the like, or any other appropriate device that includes and/or is communicatively coupled to, for example, one or more wired or wireless interfaces, such as WLAN radios, cellular radios, Bluetooth radios, Zigbee radios, near field communication (NFC) radios, and/or other wireless radios.

By way of example, in FIG. 1 each of the electronic devices 102-103 is depicted as a smart speaker, the electronic device 106 is depicted as a smartphone, the electronic device 107 is depicted as a smartwatch, and each of the electronic devices 104-105 is depicted as a set top box which may include a digital media player (e.g., configured to receive digital data such as music and/or video from one or more services associated with one or more accounts of one or more users, and stream the digital data to a display device such as a television or other video display) and/or a digital arcade (e.g., configured to providing gaming applications associated with one or more gaming accounts of one or more users). In one or more implementations, one or more of the electronic devices 104-105 may be integrated into its corresponding display device. One or more of the electronic devices 102-107 may be, and/or may include all or part of, the device discussed below with respect to FIG. 2, and/or the electronic system discussed below with respect to FIG. 6.

In one or more implementations, the electronic devices 102-105 may correspond to multi-user devices. One or more of the multi-user devices may be associated with a home account and usable to provide content and/or respond to requests (e.g., voice requests) for multiple users associated with respective user accounts of the connected home environment 116 (e.g., authorized users). One of more of the electronic devices 102-105 may be multi-user devices that are configured allow selection of an active user from multiple users of the electronic device.

In one or more implementations, the electronic device 106 may correspond to a personal device associated with a user account (e.g., of a user named "Alison"). Alison may reside in or be a guest of the home/residence (e.g., corresponding to the connected home environment 116), which is also the home of another user (e.g., named "Bob"). The electronic device 107 may be associated with a user account for Bob, and the electronic devices 102-105 may correspond to a home account for Bob. For example, the respective users may register and/or associate their respective electronic devices 102-107 to their respective user accounts through a service provider, such as through an account service of the cloud-based services 114.

In one or more implementations, Bob may interact with the electronic device 107 in order to access and/or output content (e.g., video and/or music available through Bob's content library) on one or more of the electronic devices 102-105. Moreover, (e.g., based on an invitation from Bob via the electronic device 107 and acceptance by Alison via the electronic device 106 or via direct registration of the user account of Allison at one or more of electronic devices 102-105), Alison's user account may be associated with, and accessible on, one or more of the electronic devices 102-105 (e.g., the multi-user devices) in Bob's connected home environment 116. Thus, in one example, Alison may use her electronic device 106 as a remote control in order to output content (e.g., content that is provided by the content provider 112 in association with her content library) on one or more of the electronic devices 102-105.

Alternatively or in addition, Alison may access her media content (e.g., music and/or video) on one or more of the electronic devices 102-105 without using her electronic device 106. For example, the electronic devices 102-103 (e.g., smart speakers) may have a virtual assistant application running thereon, and Alison may provide a voice request to stream music (e.g., via the content provider 112) in association with her user account (e.g., content library). In another example, the electronic devices 104-105 (e.g., set top boxes) may have respective remote control devices that Alison can use (e.g., via physical button(s) and/or voice requests spoken to the remote) to output video and/or music via the content provider 112 and/or the cloud-based services 114 in association with her user account(s).

In one or more implementations, the content provider 112 may be configured to provide content (e.g., media content and/or other type(s) of content) to a device (e.g., one or more of the electronic devices 102-107). In one or more implementations, the cloud-based services 114 may include an account service configured to perform operations in association with user accounts such as: storing data (e.g., voice profiles, user settings/preferences, billing information, purchased content information, purchased service information, etc.) with respect to a user account, sharing and/or sending data with other users with respect to a user account, and/or associating devices and/or groups of devices (e.g., within the connected home environment 116) with user accounts such as user purchase accounts that may provide access to authorized content, such as movies, music, and the like.

In one or more implementations, the cloud-based services 114 may also include a cloud storage service configured to perform operations in association with cloud accounts, such as backing up device data with respect to a cloud account, synchronizing data (e.g., messages, photos, videos, etc.) across multiple devices of a user having a cloud account, storing passwords, tokens, and/or preferences in association with the cloud account, and/or storing files such as documents and/or photos, etc. in association with the cloud account. In one or more implementations, cloud-based services 114 may also include a gaming service configured to perform operations in association with a game account such as: controlling access to gaming applications based on the game account, and/or storing gaming data (e.g., data indicating a state of play or user settings or parameters for each of one or more games) in association with a game account.

One or more of the servers 112-114 may be, and/or may include all or part of the device discussed below with respect to FIG. 2, and/or the electronic system discussed below with respect to FIG. 6. Each of the servers 112-114 may include one or more servers, such as a cloud of servers. For explanatory purposes, a single server is shown and discussed with respect to various operations for each of the servers 112-114. However, these and other operations discussed herein may be performed by one or more servers, and each different operation may be performed by the same or different servers.

Figure 2:
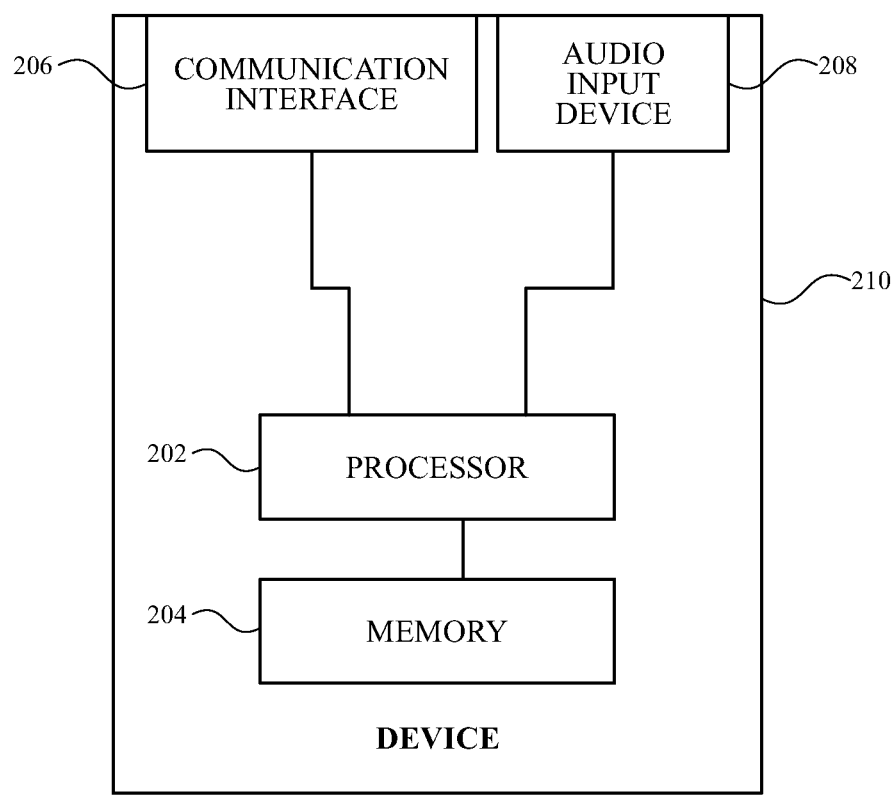
FIG. 2 illustrates an example device that may implement a system user switching for multi-user devices in accordance with one or more implementations.

FIG. 2 illustrates an example device that may implement a system for switching between users of a multi-user device in accordance with one or more implementations. For example, the device 200 of FIG. 2 can correspond to any of the electronic devices 102-107 and/or the servers 112-114 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The device 200 may include a processor 202, a memory 204, a communication interface 206 and an audio input device 208. The processor 202 may include suitable logic, circuitry, and/or code that enable processing data and/or controlling operations of the device 200. In this regard, the processor 202 may be enabled to provide control signals to various other components of the device 200. The processor 202 may also control transfers of data between various portions of the device 200. Additionally, the processor 202 may enable implementation of an operating system or otherwise execute code to manage operations of the device 200.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, in a case where the device 200 corresponds to one of the electronic devices 102-105, the memory 204 may store one or more components configured to receive a request to switch an active user of the device 200 (e.g., from a primary user to a secondary user, from a secondary user to a primary user, or from one secondary user to another secondary user) and provide for switching the active user as described herein. Moreover, the audio input device 208 may include suitable logic, circuitry, and/or code for capturing audio input, such as voice requests. For example, the audio input device 208 may include one or more microphones and/or other devices for capturing audio input.

In one or more implementations, in a case where the device 200 corresponds to the cloud-based services 114, the memory 204 may store user profile data (e.g., voice profiles), user billing data, user purchase data, and/or configuration settings associated with a home environment (e.g., the connected home environment 116) in association with user purchase accounts, may store data such as photos, messages or the like associated with cloud accounts of various users, and/or may store gaming data associated with game accounts of various users, as described in further detail hereinafter.

The communication interface 206 may include suitable logic, circuitry, and/or code that enables wired or wireless communication, such as between any of the electronic devices 102-107 and/or the servers 112-114 over the network 110 (e.g., in conjunction with the LAN 108). The communication interface 206 may include, for example, one or more of a Bluetooth communication interface, a cellular interface, an NFC interface, a Zigbee communication interface, a WLAN communication interface, a USB communication interface, or generally any communication interface.

In one or more implementations, one or more of the processor 202, the memory 204, the communication interface 206, the audio input device 208, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

When switching between users on a multi-user device (e.g., switching between user accounts on a connected home device such as a set top box or a smart speaker), the subject technology allows some applications, functions, services, games, etc. to switch to the new user and some to remain associated with the prior user. For example, it can be problematic if an application or game that a secondary user is running on the device accesses application data or game data for the primary user of that device. For example, a secondary user playing a game on the device after switching the device to their user account may find themselves playing the game as the primary user, or at a level recently played by the primary user (e.g., if the game accesses game history data associated with the primary user's gaming service account), rather than as themselves at their own level. It can also be problematic if a multi-user device that is part of a connected home environment is switched out of the connected home environment when the active user of the multi-user device is switched (e.g., away from the primary user associated with the home environment to a secondary user).

The user switching system and methods disclosed herein allow each user of a multi-user device to operate aspects of the device using their own user-specific data when appropriate, main maintaining the association of other aspects of the device with the primary user's data when appropriate, as described herein.

Figure 3:
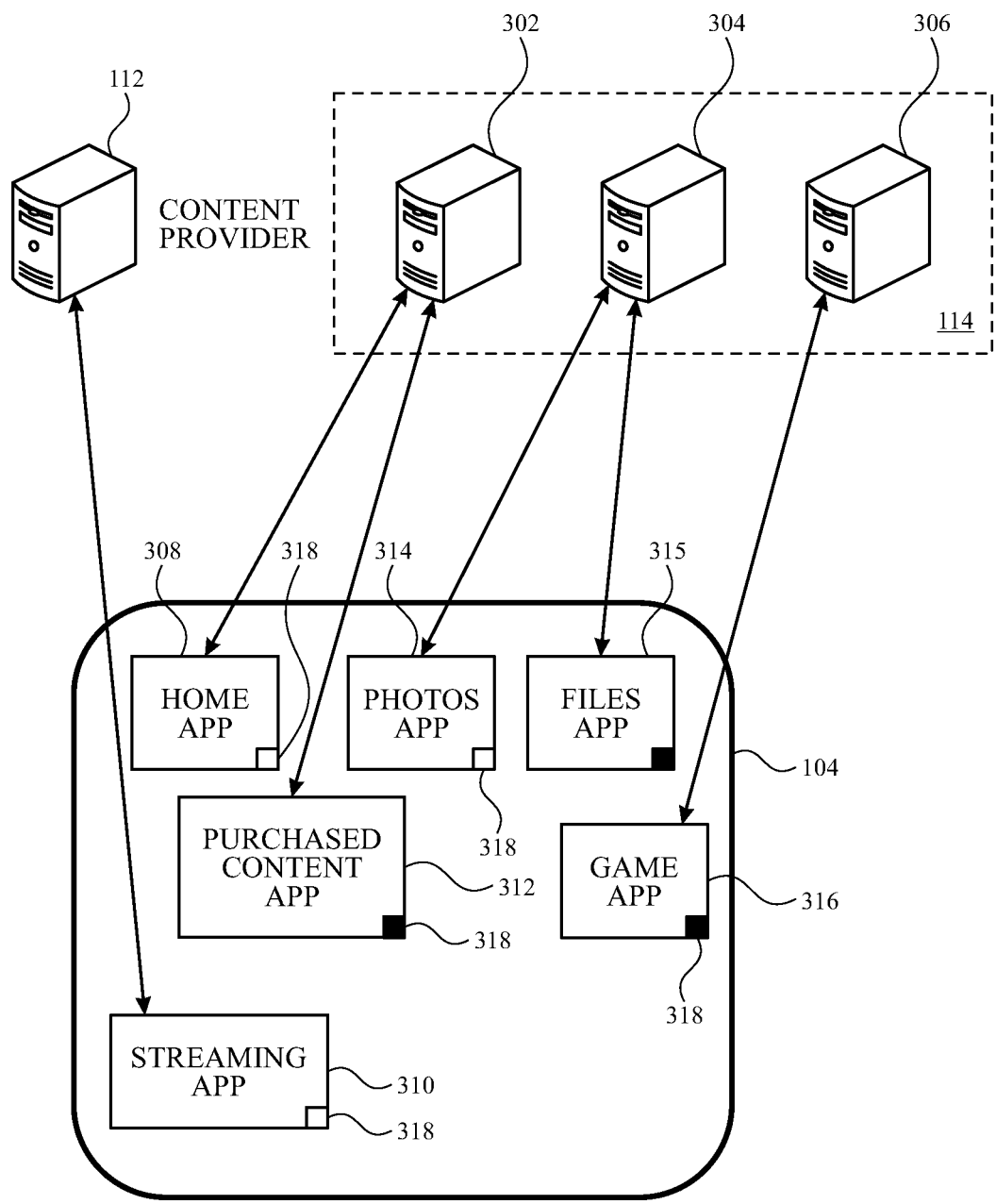
FIG. 3 illustrates an example multi-user device having various installed applications associated with various external services in accordance with one or more implementations.

FIG. 3 illustrates an example multi-user device, implemented as a set top box, that can provide for user switching between multiple users. As illustrated in FIG. 3, an electronic device 104 is implemented as a multi-user device that can provide applications (apps) such as a home app 308, a streaming app 310, a purchased content app 312, a photos app 314, a files app 315, and a game app 316. Although these examples of apps that can be provided by a multi-user device are described in connection with FIG. 3, it should be appreciated that electronic device 104 can include more or fewer apps, different apps, and/or other features and/or components.

In the example of FIG. 3, home app 308 and purchased content app 312 are configured to communicate with an account service 302 of cloud-based services 114. Home app 308 and purchased content app 312 may access account information such as billing information, profile information, connected home environment information, etc. from the account service 302 using a user purchase account identifier for a user of electronic device 104.

Home app 308 may be configured to allow the user of electronic device 104 to control other devices in a connected home environment such as one or more of electronic devices 102, 103, and 105 of connected home environment 116 and/or may allow the user of another electronic device in the connected home environment 116 to control electronic device 104. Home app 308 may be associated with a user purchase account of a primary user of the electronic device 104 that is also the primary user of one or more of electronic devices 102, 103, and 105 of connected home environment 116. When the active user of electronic device 104 is switched from the primary user to a secondary user (or between secondary users), electronic device 104 maintains the association of home app 308 with the account of the primary user. In this way, user switching at electronic device 104 may not affect the connected state of the connected home environment.

Purchased content app 312 may allow a user to access purchased content such as purchased movies, television shows, and/or purchased or subscribed services such as digital media (e.g., music or video) streaming services purchased by that user in association with their user purchase account. In contrast to the home app 308, when the active user of electronic device 104 is switched from the primary user to a secondary user (or between secondary users), electronic device 104 switches the association of purchased content app 312 to the user purchase account of the new active user. In this way, when the new active user opens the purchased content app 312, the new active user has access to their own purchased content via the purchased content app 312 (rather than access to purchased/subscribed content of the prior user's purchased content).

In the example of FIG. 3, photos app 314 and files app 315 are configured to communicate with a cloud storage service 304 of cloud-based services 114. Photos app 314 may be configured to display photos and/or videos stored at the cloud storage service 304 using a cloud account identifier for a user of electronic device 104. Photos app 314 may download some or all of the photos and/or videos stored at cloud storage service 304 so that they can be readily available for viewing with the electronic device 104. Files app 315 may be configured to provide access to one or more files and/or file folders stored for a user at the cloud storage service 304.

When the active user of electronic device 104 is switched from the primary user to a secondary user (or between secondary users), electronic device 104 maintains the association of photos app 314 with the cloud account of the primary user. In this way, user switching at electronic device 104 does not cause frequent massive data transfers between electronic device 104 and cloud storage service 304 to pre-load the photos of a particular user to the electronic device 104. In contrast to the photos app 314, when the active user of electronic device 104 is switched from the primary user to a secondary user (or between secondary users), electronic device 104 switches the association of files app 315 to the cloud account of the new active user. In this way, when the new active user opens the files app 315, the new active user has access to their own files via the files app 315 (rather access to the prior user's files).

In the example of FIG. 3, game app 316 may be configured to communicate with a gaming service 306 of cloud-based services 114. Game app 316 may be configured to interactively provide a gaming experience to a user of electronic device 104. Game app 316 may determine whether a user has access to the game and/or may obtain gaming data such as game progress data (e.g., data indicating a highest level reached and/or in-game rewards achieved) from the gaming service 306 using a game account identifier for an active user of electronic device 104.

When the active user of electronic device 104 is switched from the primary user to a secondary user (or between secondary users), electronic device 104 switches the association of game app 316 to the game account of the current active user. In this way, user switching at electronic device 104 ensures that each user of game app 316 plays the game as themselves (including using their own avatar and/or from the last level reached) rather than as the primary or previous user.

In order to allow the electronic device 104 to determine whether to switch the association of each application when the active user is switched, each application at electronic device 104 may be configured as a multi-user application or a single user application. For example, each application may be configured as a multi-user application or a single user application by an active user flag 318 that can be selected or de-selected, respectively, such as by the developer of each application. In the example of FIG. 3, the active user flag 318 is selected for purchased content app 312, files app 315, and game app 316 (e.g., so that user-specific data for the current active user of the electronic device 104 is used for operation of that application, as described above), and active user flag 318 is unselected for home app 308, photos app 314, and streaming app 310 (e.g., so that data for the primary user of electronic device 104 is used for the operation of that application, regardless of and/or irrespective of which user is currently the active user of the device).

As discussed in further detail herein, when an application is launched at electronic device 104, a system level process may receive a request for global variables, including global variables that provide access and/or reference to user-specific data, such as a pointer to, and/or entitlement/privilege for, user-specific data. The system level processes may provide the application with user information for the primary user of the device if the active user flag 318 is not selected, and may provide the application with the global variables for the active user of the device (whether the active user is the primary user of one of one or more secondary users) if the active user flag 318 is selected. In this way, electronic device 104 can manage the user switching for multiple applications associated with multiple services for multiple users.

In one or more implementations, the global variables that are provided to an application may direct the application to information corresponding to a user purchase account identifier (ID), a cloud account identifier (ID) and/or a gaming account identifier (ID) that allow the application to access the relevant data for a relevant user at the electronic device and/or at the relevant cloud-based service. In one or more implementations, the information may be security tokens that provide authorization to the user purchase account identified by the user purchase account identifier, the cloud account identified by the cloud account identifier, and/or the game account identified by the gaming account identifier.

In the example of FIG. 3, streaming app 310 may be a third party streaming application that is configured to stream content from content provider 112. One or more of the users of electronic device 104 may also have streaming accounts with the content provider 112. In some implementations, two or more (e.g., all) of the users of the electronic device 104 may share a single account with the content provider 112. In some examples, streaming app 310 can itself maintain multiple user preferences or histories as part of the single account with the content provider 112. When the active user of electronic device 104 is switched from the primary user to a secondary user (or between secondary users), electronic device 104 may maintain the association of streaming app 310 with the content provider account of the primary user if the active user flag 318 is not selected, or may switch the association of the streaming app 310 to the content provider account of the active user if the active user flag 318 is selected. Although the active user flag may be set by the developer of the application, in one or more implementations, the active user flag may also be user-configurable, such as on a per-application basis.

Data may be stored, arranged, transferred, and/or otherwise managed by a multi-user device, such as electronic device 104, in a way that facilitates the user switching operations described in connection with FIG. 3.

Figure 4:
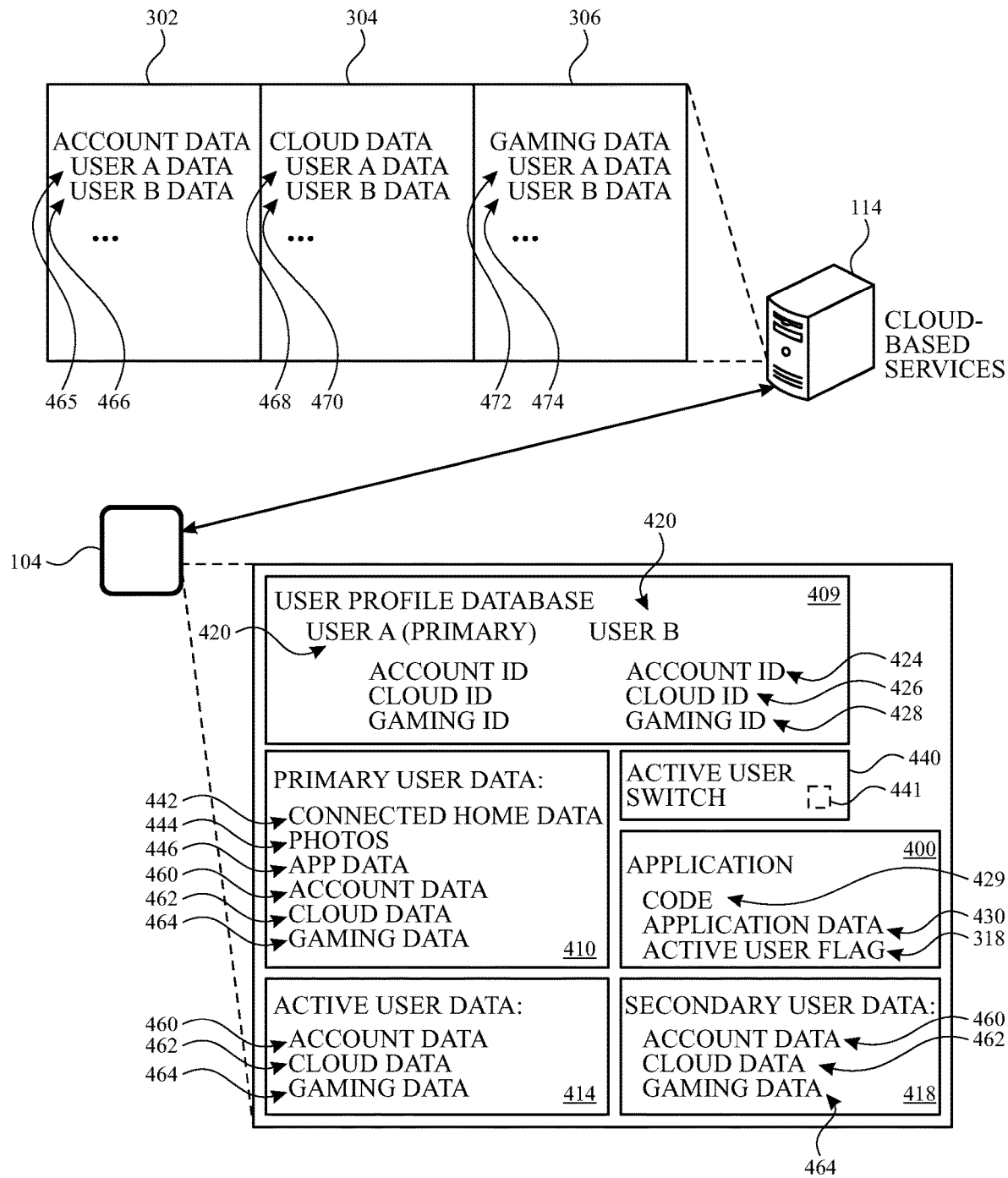
FIG. 4 illustrates a block diagram of a multi-user device in communication with cloud-based services in accordance with one or more implementations.

FIG. 4 illustrates a schematic diagram of an example of data storage and/or management at electronic device 104 to facilitate user switching. As shown in FIG. 4, an application 400 (e.g., purchased content app 312, files app 315, game app 316, home app 308, photos app 314, streaming app 310, and/or any other app) installed at the electronic device 104 may include an active user flag 318 as described above, code 429 for running the application, and application data 430. Application data 430 may include general application data such as libraries or the like that are permanently or semi-permanently stored (e.g., between software updates) for the application, and/or runtime data such as user-specific data obtained by application 400 during operation of the application.

FIG. 4 also schematically illustrates an active user switch 440 that can be provided by electronic device 104. Active user switch 440 may include a user interface with which a user can select, from the authorized or registered users of the electronic device 104, a current active user. The user interface for the active user switch 440 may include, for example, a scrollable list of user names for users that have registered with electronic device 104 (e.g., using their own user purchase accounts with account service 302). As described above in connection with FIG. 3, when the active user flag 318 for application 400 is selected, application 400 is provided with one or more global variables that direct the application to the data for an active user selected by the active user switch 440. As described above in connection with FIG. 3, when the active user flag 318 for application 400 is not selected, application 400 is provided with one or more global variables that direct the application to the data for the primary user of electronic device 104, regardless of and/or irrespective of which user has been selected by the active user switch 440.

As illustrated in FIG. 4, electronic device 104 may locally store primary user data 410 for the primary user of electronic device 104, secondary user data 418 for a secondary user of the electronic device 104, and/or active user data 414 for a current active user of the electronic device. The active user may be the primary user or one of the secondary users at any given time.

Electronic device 104 may also include a user profile database 409 in which user profiles for the primary user and/or one or more secondary users are stored. In the example of FIG. 4, the user profile database 409 includes user profile 420 (e.g., a primary user profile for a primary user, referenced in FIG. 4 as "User A") and a user profile 420 (e.g., a secondary user profile for a secondary user, referenced in FIG. 4 as "User B"), though it should be appreciated that user profile database 409 may also store user profiles for one or more additional secondary users of electronic device 104.

As illustrated in FIG. 4, each user profile in the user profile database 409 may include identifiers (IDs) of one or more (e.g., at least two) accounts for the corresponding user. In the example of FIG. 4, the account identifiers for each user profile include a purchase account ID 424, a cloud account ID 426, and a gaming account ID 428. The purchase account ID 424 for each user profile may be an identifier of a user purchase account of the corresponding user at account service 302. The cloud account ID 426 for each user profile may be an identifier of a cloud account of the corresponding user at cloud storage service 304. The gaming account identifier 428 may be an identifier of a gaming account of the corresponding user at gaming service 306. Although not explicitly shown in FIG. 4, it should be appreciated that authorization information (e.g., one or more passwords or other security information previously provided by each user, and/or cryptographic information derived therefrom) may also be stored in association with each of the purchase account ID 424, the cloud account ID 426, and the gaming account ID 428 of each user profile to facilitate access to the corresponding data stored at the cloud-based services 114.

As indicated in FIG. 4, account service 302 may store account data (e.g., user purchase account data) for each of the users of electronic device 104 (e.g., including User A Data 465 for User A of electronic device 104 and User B Data 466 for User B of electronic device 104), and for other users of other electronic devices. Cloud storage service 304 may store cloud data for each of the users of electronic device 104 (e.g., including User A Data 468 for User A of electronic device 104 and User B data 470 for User B of electronic device 104), and for other users of other electronic devices. In one or more implementations, the cloud data stored for each user at cloud storage service 304 may include, photos, files, one or more passwords, tokens, preferences, or the like for one or more accounts, applications, games, etc. associated with that user. Gaming service 306 may store gaming data for each of the users of electronic device 104 (e.g., including User A Data 472 for User A of electronic device 104 and User B data 474 for User B of electronic device 104), and for other users of other electronic devices.

Application 400 can be associated with any one of several accounts and/or remote services, and each user of electronic device 104 can have an account with any of the remote services (e.g., as described in connection with FIG. 3). Storing the various account identifiers in the user profile for each user allows electronic device 104 to provide application 400 with the correct user-specific data associated with the correct account of the correct user, even for multi-user devices having multiple users, each with multiple application-related accounts.

In order to efficiently direct an application 400 to the user-specific data for the correct user account of the correct user, electronic device 104 may locally store user-specific data in separate portions (e.g., separate partitions or volumes) of the memory of the electronic device that are reserved for a specific user. In the example of FIG. 4, electronic device 104 includes storage for primary user data 410 of a primary user. As shown, primary user data 410 may include connected home data 442, photos 444, and app data 446 (as examples). Connected home data 442 may include data for accessing and/or controlling other devices in the connected home environment 116 of FIG. 1, and/or for allowing and/or coordinating access and/or control of electronic device 104 by one or more of the other devices or other users of the connected home environment 116. Photos 444 may be photos (and/or videos) that are stored at electronic device 104 (e.g., for viewing and/or management using photos app 314 of FIG. 3). Photos 444 may include some or all of (and may be occasionally or periodically synchronized with) the photos stored in the User A data 468 at cloud storage service 304. App data 446 may be application data that is used by other applications at electronic device 104 that do not have the active user flag selected, such as account information and/or history information for streaming app 310 of FIG. 3.

Primary user data 410 may also include account data 460, cloud data 462, and gaming data 464 for the primary user. Account data 460, cloud data 462, and gaming data 464 stored in the primary user data 410 at electronic device may include (e.g., and may be occasionally or periodically synchronized with), some or all of the User A Data 465 at account service 302, User A data 468 at cloud storage service 304, and User A data 472 at gaming service 306, respectively. Electronic device 104 stores the user purchase account ID 424, the cloud account ID 426, and the gaming account ID 428 in the user profile 420 of the primary user for accessing the User A Data 465 at account service 302, User A data 468 at cloud storage service 304, and User A data 472 at gaming service 306 (e.g., for populating and/or synchronizing the corresponding primary user data 410 prior to running an application 400 and/or for obtaining the application data 430 at runtime for an application 400).

In the example of FIG. 4, electronic device 104 also includes storage for secondary user data 418 of a secondary user (e.g., a secondary user such as User B of FIG. 4 for which a user profile 420 is stored). Although FIG. 4 only shows secondary user data 418 for a single secondary user (e.g., User B), it should be appreciated that electronic device 104 may include additional separate storage for secondary user data 418 of one or more additional secondary users (e.g., additional secondary users for which additional user profiles 420, each including a user purchase account ID 424, a cloud account ID 426, and a gaming account ID 428, are stored in user profile database 409).

As shown, secondary user data 418 may include account data 460, cloud data 462, and gaming data 464 for the secondary user. Account data 460, cloud data 462, and gaming data 464 stored in the secondary user data 418 at electronic device 104 may include (e.g., and may be occasionally or periodically synchronized with), some or all of the User B Data 466 at account service 302, User B data 470 at cloud storage service 304, and User B data 474 at gaming service 306, respectively. Electronic device 104 stores the user purchase account ID 424, the cloud account ID 426, and the gaming account ID 428 in the user profile 420 of the secondary user for accessing the User B Data 466 at account service 302, User B data 470 at cloud storage service 304, and User B data 474 at gaming service 306 (e.g., for populating and/or synchronizing the corresponding secondary user data 418 prior to running an application 400 and/or for obtaining the application data 430 at runtime for an application 400).

In one or more implementations, in addition to, or alternatively to storing account data 460, cloud data 462, and gaming data 464 for each user in dedicated memory for that user (e.g., in separate memory partitions for primary user data 410 and secondary user data 418) at electronic device 104, the account data 460, cloud data 462, and gaming data 464 can be obtained and stored only for the current active user of electronic device, such as in active user data 414 (e.g., before or at runtime for an application 400 associated with one of the account service 302, the cloud storage service 304, and the gaming service 306).

For example, when the active user is switched from a primary user (e.g., User A of FIG. 4) to a secondary user (e.g., User B of FIG. 4), the purchase account ID 424 of the secondary user may be used to access the account data (e.g., User B Data 466) at account service 302 to download information associated with media purchased by the secondary user into the account data 460 of the active user data 414 (e.g., for use as the application data 430 for a media player application at the electronic device). In this example, the information associated with media purchased by the secondary user can replace information associated with media purchased by the primary user that was stored as the account data 460 in the active user data 414 while the primary user was the active user. Similar operations can be performed to replace cloud data 462 and/or gaming data 464 stored for the primary user in the active user data 414 while the primary user was the active user with cloud data 462 and/or gaming data 464 for the secondary user when the active user is switched from the primary user to the secondary user.

In other implementations, the account data, cloud data, and gaming data for the primary user and the one or more secondary users may be stored in the respective primary user data 410 and secondary user data 418 (e.g., and periodically synchronized with the corresponding data at cloud-based services 114), and accessed directly therefrom by application 400 (e.g., without replacing/moving data into and out of a data store for a current active user). In other implementations, the account data, cloud data, and gaming data for the primary user and the one or more secondary users may be stored in the respective primary user data 410 and secondary user data 418 (e.g., and periodically synchronized with the corresponding data at cloud-based services 114), and copied to the respective active user data 414 from the primary user data 410 or the secondary user data 418 when the primary user or the secondary user is selected as the active user.

In order to provide access (e.g., read and/or write access) to the user-specific data for the correct user account of the correct user to any application 400 installed at electronic device 104 (e.g., when the application is launched and/or during running of the application), electronic device 104 may provide (e.g., as one of a set of global variables that define a launch context for an application), a user tag that identifies the correct user for that application. When an application 400 launches at electronic device 104, the system-level processes at electronic device 104 determine whether the active user flag for that application is selected. If the active user flag for that application is selected, the system-level processes set the user tag to indicate the active user (e.g., which may be the primary user or one of one or more secondary users), and provides the user tag to the application. If the active user flag for that application is unselected, the system-level processes set the user tag to indicate the primary user (e.g., irrespective of which user is set as the active user), and provides the user tag to the application. In this way, each application running on electronic device 104 can be pointed to the data for the correct user for that application. For example, each application 400 can use the user tag to determine the location (e.g., primary user data 410, secondary user data 418, or active user data 414) from which to obtain user-specific data for running of the application, and/or to determine the location (e.g., primary user data 410, secondary user data 418, or active user data 414) to which to write user-specific data based on the running of the application.

Further, because the electronic device 104 maintains user profiles and/or user data (and/or access thereto) for each of the various accounts of each user (e.g., including user account IDs and/or user account data for account service 302, cloud storage service 304, and gaming service 306) that are associated with the various applications installed at the electronic device, each application can determine the location of the correct data for the correct account for running the application using only the provided user tag. For example, upon launch, home app 308 may be provided with a user tag that indicates the primary user (regardless of and/or irrespective of which user is set as the active user because the active user flag 318 is not selected) and can obtain account data 460 associated with User A data 465 for account service 302 using the provided user tag identifying the primary user. As another example, upon launch, game app 316 may be provided with a user tag that indicates the secondary user (e.g., in a scenario in which the secondary user is the active user, and because the active user flag 318 is selected) and can obtain gaming data 464 associated with User B data 474 for gaming service 306 using the provided user tag identifying the primary user. In this way, each application 400 runs based on the user-specific data for the correct user account of the correct user.

In one or more implementations, when the active user is changed (e.g., using active user switch 440) between launches of an application 400, the application may receive a user tag identifying the same or a different user depending on whether the active user flag 318 is set for the application. In one or more implementations, when the active user is changed while application is running, the system-level processes at electronic device 104 may determine whether the active user flag 318 for the application is selected, and if so, may close the application, re-launch the application, and provide the re-launching application with an updated user tag indicating the new active user. In one or more implementations, the close and re-launch of the application caused by a user switch can be performed in the background. In one or more implementations, the application may be refreshed to reflect the active user without closing and re-launching.

Figure 5:
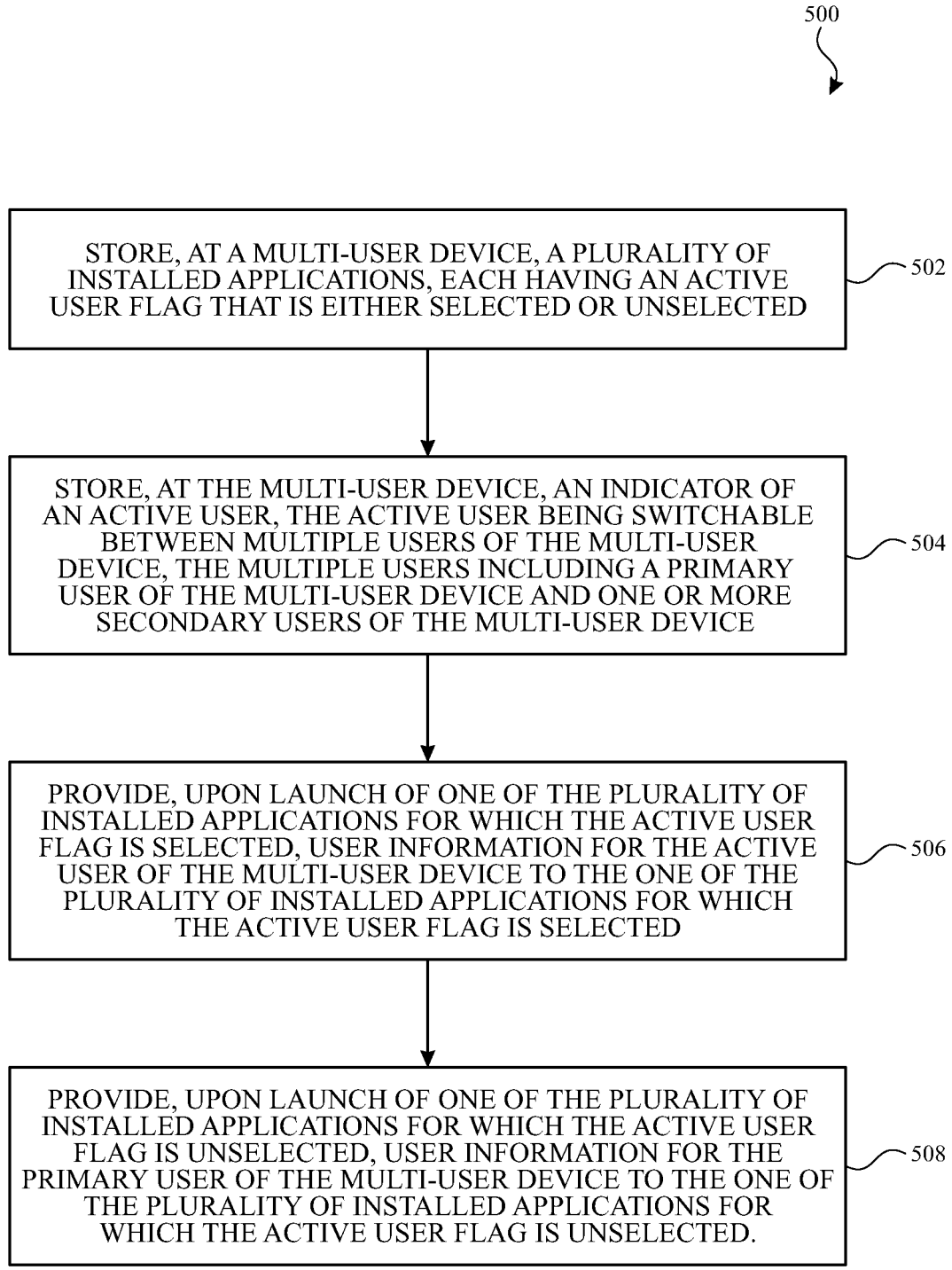
FIG. 5 illustrates a flow diagram of an example process for user switching for multi-user devices in accordance with one or more implementations.

FIG. 5 illustrates an example process for user switching for a multi-user device in accordance with one or more implementations. For explanatory purposes, the process 500 is primarily described herein with reference to the electronic device 104 and the cloud-based services 114 of FIG. 1. However, the process 500 is not limited to the electronic device 104 and the cloud-based services 114 of FIG. 1, and one or more blocks (or operations) of the process 500 may be performed by one or more other components and/or other suitable devices (e.g., any of the electronic devices 102-107 and/or one or more other servers and/or services). Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

In the example process 500, at block 502, a multi-user device may store (e.g., in memory of the multi-user device) a plurality of installed applications (e.g., application 400 of FIG. 4, such as home app 308, photos app 314, files app 315, purchased content app 312, game app 316, streaming app 310, or any other application), each being configured as a multi-user application or a single user application, such as by having an active user flag 318 that is either selected or unselected.

At block 504, the multi-user device may store an indicator 441 of an active user, the active user being switchable between multiple users of the multi-user device, the multiple users including a primary user (e.g., User A in the example of FIG. 4) of the multi-user device and one or more secondary users (e.g., User B in the example of FIG. 4) of the multi-user device. The multi-user device may also store, for each user of the multiple users of the multi-user device, a user profile, such as user profile 420 as described above in connection with FIG. 4, that includes at least two account identifiers for that user. The at least two account identifiers may include two or more of a purchase account identifier 424 of a user purchase account (e.g., a user purchase account associated with a user purchase service such as account service 302), a cloud account identifier 426 of a cloud account (e.g., a cloud account associated with a cloud storage service such as cloud storage service 304), and a gaming account identifier 428 of a gaming account (e.g., a gaming account associated with a gaming service such as gaming service 306).

At block 506, upon launch of one of the plurality of installed applications that is configured as a multi-user application (e.g., for which the active user flag is selected), user information for the active user (e.g., a user tag indicating the active user) of the multi-user device may be provided to the one of the plurality of installed applications that is configured as a multi-user application (e.g., the one of the plurality of installed applications for which the active user flag 318 is selected).

The one of the plurality of installed applications for which the active user flag 318 is selected may obtain user-specific data for running of the application using the user information for the active user of the multi-user device. The multi-user electronic device may then run the one of the plurality of installed applications for which the active user flag is selected using the user-specific data. In one or more examples, obtaining the user-specific data (e.g., for the active user) may include obtaining the user-specific data from local storage for the active user (e.g., from active user data 414 or secondary user data 418) at the multi-user device. In one or more examples, obtaining (e.g., for the active user) the user-specific data may include obtaining the user-specific data from a cloud-based service (e.g., from account service 302, cloud storage service 304, or gaming service 306).

In various operational scenarios, the one of the plurality of installed applications for which the active user flag is selected may be associated with one of the user purchase account, the cloud account, and the game account, and obtaining the user-specific data may include obtaining the user-specific data using a corresponding one of the purchase account identifier 424, the cloud account identifier 426, and the gaming account identifier 428 in the user profile 420 for the active user (e.g., User B in the example of FIG. 4).

At block 508, upon launch of another of the plurality of installed applications configured as the single user application (e.g., one of the plurality of installed applications for which the active user flag 318 is unselected), user information for the primary user of the multi-user device (e.g., a user tag indicating the primary user) may be provided to the other of the plurality of installed applications configured as the single user application (e.g., the one of the plurality of installed applications for which the active user flag 318 is unselected). The user information for the primary user may be provided to the single user application (e.g., the one of the plurality of installed applications for which the active user flag is unselected) irrespective of whether the primary user is the active user (e.g., whether the primary user is or is not the active user upon launch of the other of the plurality of installed applications). In some operational scenarios, providing the user information for the primary user to the one of the plurality of installed applications for which the active user flag is unselected may include providing the user information for the primary user to the one of the plurality of installed applications for which the active user flag is unselected, while the active user is one of the one or more secondary users. In other operational scenarios, providing the user information for the primary user to the one of the plurality of installed applications for which the active user flag is unselected may include providing the user information for the primary user to the one of the plurality of installed applications for which the active user flag is unselected, while the active user is the primary user.

The one of the plurality of installed applications for which the active user flag 318 is unselected may obtain user-specific data (e.g., connected home data 442, photos 444, app data 446, account data 460, cloud data 462, and/or gaming data 464 for the primary user) for running of the application using the user information for the primary user of the multi-user device. The multi-user electronic device may then run the one of the plurality of installed applications for which the active user flag is unselected using the user-specific data. In one or more examples, obtaining the user-specific data (e.g., for the primary user) may include obtaining the user-specific data from local storage for the primary user (e.g., active user data 414 or primary user data 410) at the multi-user device. In one or more examples, obtaining (e.g., for the primary user) the user-specific data may include obtaining the user-specific data from a cloud-based service (e.g., from the User A data at account service 302, cloud storage service 304, or gaming service 306).

In various operational scenarios, the one of the plurality of installed applications for which the active user flag is unselected may be associated with one of the user purchase account, the cloud account, and the game account of the primary user, and obtaining the user-specific data may include obtaining the user-specific data using a corresponding one of the purchase account identifier 424, the cloud account identifier 426, and the gaming account identifier 428 in the user profile 420 for the primary user (e.g., User A in the example of FIG. 4).

The multi-user device may also provide an active user switch 440 by which the active user of the multi-user device can be selected from the multiple users of the multi-user device. Prior to providing user information to a launching application (e.g., at block 506 or 508), the multi-user device may determine whether an active user flag 318 for the launching application is selected. The multi-user device may also determine, prior to providing the user information for the active user of the multi-user device to the one of the plurality of installed applications for which the active user flag is selected at block 506, whether the active user is the primary user or one of the one or more secondary users.

In a state of the multi-user device in which the primary user is the active user, the memory of the device may store first user-specific information (e.g., connected home data 442 or photos 444 as described in connection with FIG. 3) for the primary user associated with a first one of the installed applications (e.g., home app 308, photos app 314), and may store second user-specific information (e.g., account data 460, cloud data 462, or gaming data 464) for the primary user and associated with a second one of the installed applications (e.g., purchased content app 312, files app 315, or game app 316). Responsive to a switch of the active user from the primary user to one of the one or more secondary users, multi-user electronic device 104 may continue to store the first user-specific information for the primary user and associated with a first one of the installed applications, and may replace, in the memory, the second user-specific information for the primary user and associated with the second one of the installed applications with different user-specific information (e.g., account data 460, cloud data 462, or gaming data 464 for the secondary user) for the one of the one or more secondary users and associated with the second one of the installed applications (e.g., purchased content app 312, files app 315, or game app 316).

The present disclosure recognizes that the use of such personal information data, in the present technology, can be used to the benefit of users. For example, the personal information data can be used for user switching for a multi-user device. Accordingly, use of such personal information data may facilitate transactions (e.g., on-line transactions). Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of user switching for a multi-user device, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 6:
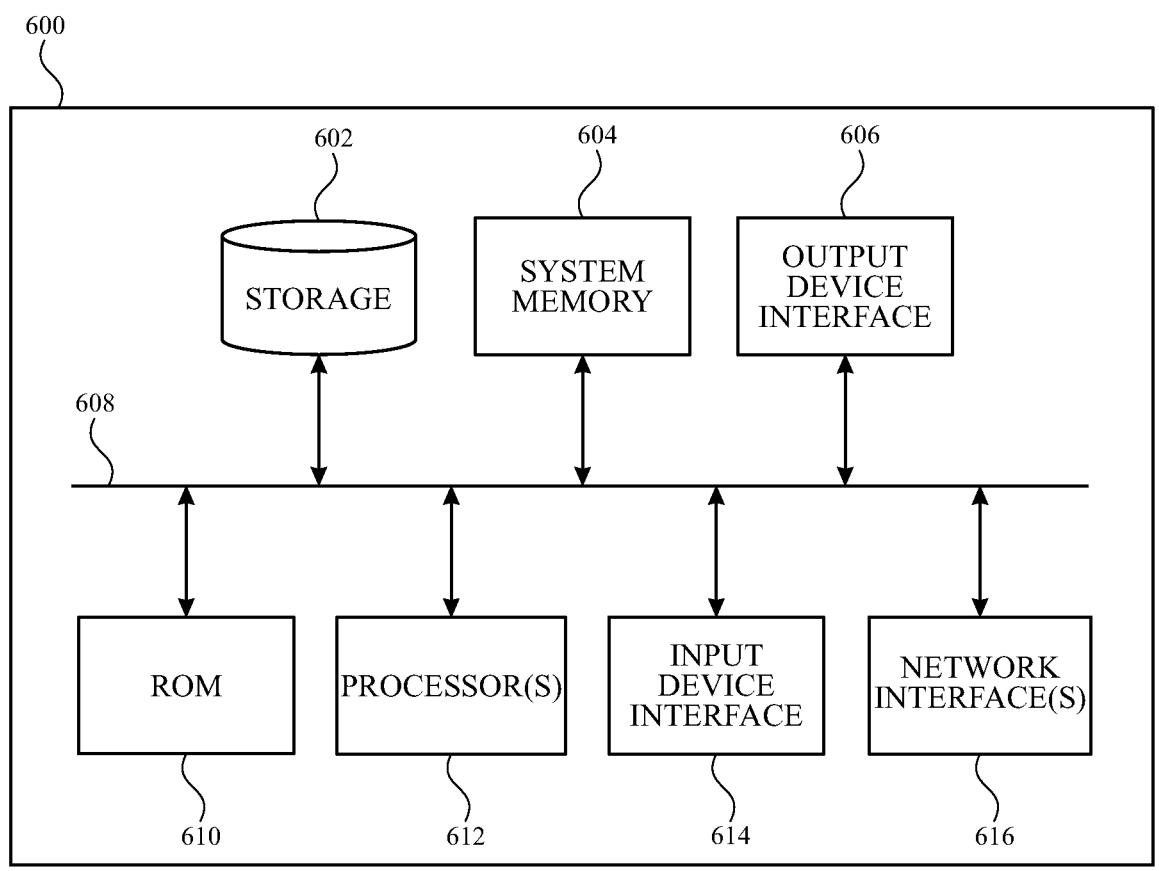
FIG. 6 illustrates an example electronic system with which aspects of the subject technology may be implemented in accordance with one or more implementations.

FIG. 6 illustrates an electronic system 600 with which one or more implementations of the subject technology may be implemented. The electronic system 600 can be, and/or can be a part of, one or more of the electronic devices 102-107, the content provider 112 and/or the cloud-based services 114 shown in FIG. 1. The electronic system 600 may include various types of computer readable media and interfaces for various other types of computer readable media. The electronic system 600 includes a bus 608, one or more processing unit(s) 612, a system memory 604 (and/or buffer), a ROM 610, a permanent storage device 602, an input device interface 614, an output device interface 606, and one or more network interfaces 616, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 612 may need at runtime. In one or more implementations, the processes of the subject disclosure are stored in the system memory 604, the permanent storage device 602, and/or the ROM 610. From these various memory units, the one or more processing unit(s) 612 retrieves instructions to execute and data to process in order to execute the processes of one or more implementations.

The bus 608 also connects to the input and output device interfaces 614 and 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 608 also couples the electronic system 600 to one or more networks and/or to one or more network nodes, such as the content provider 112 shown in FIG. 1, through the one or more network interface(s) 616. In this manner, the electronic system 600 can be a part of a network of computers (such as a LAN, a wide area network ("WAN"), or an Intranet, or a network of networks, such as the Internet. Any or all components of the electronic system 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

In accordance with aspects of the disclosure, a multi-user device, is provided that includes a memory storing a plurality of installed applications, each having an active user flag that is either selected or unselected, and an indicator of an active user, the active user being switchable between multiple users of the multi-user device, the multiple users including a primary user of the multi-user device and one or more secondary users of the multi-user device; and one or more processors configured to provide, upon launch of one of the plurality of installed applications for which the active user flag is selected, user information for the active user of the multi-user device to the one of the plurality of installed applications for which the active user flag is selected, and provide, upon launch of one of the plurality of installed applications for which the active user flag is unselected, user information for the primary user of the multi-user device to the one of the plurality of installed applications for which the active user flag is unselected.

In accordance with aspects of the disclosure, storing, at a multi-user device, a plurality of installed applications, each having an active user flag that is either selected or unselected; storing, at the multi-user device, an indicator of an active user, the active user being switchable between multiple users of the multi-user device, the multiple users including a primary user of the multi-user device and one or more secondary users of the multi-user device; providing, upon launch of one of the plurality of installed applications for which the active user flag is selected, user information for the active user of the multi-user device to the one of the plurality of installed applications for which the active user flag is selected; and providing, upon launch of one of the plurality of installed applications for which the active user flag is unselected, user information for the primary user of the multi-user device to the one of the plurality of installed applications for which the active user flag is unselected.

In accordance with aspects of the disclosure, a non-transitory machine-readable medium is provided storing instructions that, when executed by one or more processors, causes the one or more processors to: store, at a multi-user device, a plurality of installed applications, each having an active user flag that is either selected or unselected; store, at the multi-user device, an indicator of an active user, the active user being switchable between multiple users of the multi-user device, the multiple users including a primary user of the multi-user device and one or more secondary users of the multi-user device; provide, upon launch of one of the plurality of installed applications for which the active user flag is selected, user information for the active user of the multi-user device to the one of the plurality of installed applications for which the active user flag is selected; and provide, upon launch of one of the plurality of installed applications for which the active user flag is unselected, user information for the primary user of the multi-user device to the one of the plurality of installed applications for which the active user flag is unselected.

In accordance with aspects of the disclosure, a non-transitory machine-readable medium is provided storing instructions that, when executed by one or more processors, causes the one or more processors to: store, at a multi-user device, a plurality of installed applications, each being configured as a multi-user application or a single user application; provide, upon launch of one of a plurality of installed applications configured as the multi-user application, user information for an active user to the one of the plurality of installed applications; and provide, upon launch of another of the plurality of installed applications configured as the single user application, user information for the primary user of the multi-user device to the other of the plurality of installed applications irrespective of whether the primary user is the active user.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A multi-user device, comprising:
   a memory storing:
      a plurality of installed applications, each having a respective active user flag that is either selected or unselected; and
      an indicator of an active user separate from the respective active user flags, the active user being switchable between multiple users of the multi-user device, the multiple users including a primary user of the multi-user device and one or more secondary users of the multi-user device; and
   one or more processors configured to:
      provide, upon launch of one of the plurality of installed applications that was stored in the memory with the respective active user flag selected prior to the launch, user information for the active user of the multi-user device to the one of the plurality of installed applications for which the respective active user flag is selected; and
      provide, upon launch of one of the plurality of installed applications that was stored in the memory with the respective active user flag unselected prior to the launch, user information for the primary user of the multi-user device to the one of the plurality of installed applications for which the respective active user flag is unselected.

2. The multi-user device of claim 1, wherein the one or more processors are configured to provide the user information for the primary user to the one of the plurality of installed applications for which the active user flag is unselected, while the active user is one of the one or more secondary users.

3. The multi-user device of claim 1, wherein the one or more processors are configured to provide the user information for the primary user to the one of the plurality of installed applications for which the active user flag is unselected, while the active user is the primary user.

4. The multi-user device of claim 1, wherein the memory further stores, for each user of the multiple users of the multi-user device, a user profile that includes at least two account identifiers for that user.

5. The multi-user device of claim 4, wherein the at least two account identifiers includes two or more of a purchase account identifier of a user purchase account, a cloud account identifier of a cloud account, and a game account identifier of a gaming account.

6. The multi-user device of claim 1, wherein the one or more processors are further configured to:
provide an active user switch by which the active user of the multi-user device can be selected from the multiple users of the multi-user device; and
prior to providing user information to a launching application, determine whether an active user flag for the launching application is selected.

7. The multi-user device of claim 6, wherein the one or more processors are further configured to determine, prior to providing the user information for the active user of the multi-user device to the one of the plurality of installed applications for which the active user flag is selected, whether the active user is the primary user or one of the one or more secondary users.

8. The multi-user device of claim 6, wherein:
while the primary user is the active user, the memory stores:
first user-specific information for the primary user and associated with a first one of the installed applications; and
second user-specific information for the primary user and associated with a second one of the installed applications; and
responsive to a switch of the active user from the primary user to one of the one or more secondary users, the one or more processors are configured to:
continue to store the first user-specific information for the primary user and associated with the first one of the installed applications; and
replace, in the memory, the second user-specific information for the primary user and associated with the second one of the installed applications with different user-specific information for the one of the one or more secondary users and associated with the second one of the installed applications.

9. A method, comprising:
storing, at a device, a plurality of installed applications, each having a respective active user flag that is either selected or unselected;
storing, at the device, an indicator of an active user separate from the respective active user flags, the active user being switchable between multiple users of the device, the multiple users including a primary user of the device and one or more secondary users of the device;
providing, upon launch of one of the plurality of installed applications that was stored in the memory with the respective active user flag selected prior to the launch, user information for the active user of the device to the one of the plurality of installed applications for which the respective active user flag is selected; and
providing, upon launch of one of the plurality of installed applications that was stored in the memory with the active user flag unselected prior to the launch, user information for the primary user of the device to the one of the plurality of installed applications for which the respective active user flag is unselected.

10. The method of claim 9, wherein providing the user information for the primary user to the one of the plurality of installed applications for which the active user flag is unselected comprises providing the user information for the primary user to the one of the plurality of installed applications for which the active user flag is unselected, while the active user is one of the one or more secondary users.

11. The method of claim 9, wherein providing the user information for the primary user to the one of the plurality of installed applications for which the active user flag is unselected comprises providing the user information for the primary user to the one of the plurality of installed applications for which the active user flag is unselected, while the active user is the primary user.

12. The method of claim 9, further comprising storing at the device, for each user of the multiple users of the device, a user profile that includes at least two account identifiers for that user.

13. The method of claim 12, wherein the at least two account identifiers includes two or more of a purchase account identifier of a user purchase account, a cloud account identifier of a cloud account, and a game account identifier of a gaming account.

14. The method of claim 13, further comprising:
obtaining, by the one of the plurality of installed applications for which the active user flag is selected and using the user information for the active user of the device, user-specific data; and
running the one of the plurality of installed applications for which the active user flag is selected using the user-specific data.

15. The method of claim 14, wherein the one of the plurality of installed applications for which the active user flag is selected is associated with one of the user purchase account, the cloud account, and the game account, and wherein obtaining the user-specific data comprises obtaining the user-specific data using a corresponding one of the purchase account identifier, the cloud account identifier, and the game account identifier in the user profile for the active user.

16. The method of claim 15, wherein obtaining the user-specific data comprises obtaining the user-specific data from local storage for the active user at the device.

17. The method of claim 15, wherein obtaining the user-specific data comprises obtaining the user-specific data from a cloud-based service.

18. A non-transitory machine-readable medium storing instructions that, when executed by one or more processors, causes the one or more processors to:
store, at a multi-user device, a plurality of installed applications, each being configured as a multi-user application or a single user application, wherein a user of each multi-user application is switchable between multiple users of the device;

provide, upon launch of one of a plurality of installed applications that was configured prior to the launch as the multi-user application, user information for an active user to the one of the plurality of installed applications; and provide, upon launch of another of the plurality of installed applications that was configured prior to the launch as the single user application, user information for a primary user of the multi-user device to the other of the plurality of installed applications irrespective of whether the primary user is the active user.

19. The non-transitory machine-readable medium of claim 18, wherein the primary user is not the active user upon launch of the other of the plurality of installed applications.

20. The non-transitory machine-readable medium of claim 18, wherein the primary user is the active user upon launch of the other of the plurality of installed applications.

* * * * *